3,814,740
PREPARATION OF METHACRYLATE
COPOLYMERS
Robert S. Miller, Bridgewater, N.J., assignor to
Tenneco Chemicals, Inc.
No Drawing. Filed July 13, 1972, Ser. No. 271,451
Int. Cl. C08f 15/18, 45/24
U.S. Cl. 260—86.1 E                    13 Claims

ABSTRACT OF THE DISCLOSURE

This process provides for the preparation of copolymers of methyl methacrylate with up to 20 mol percent of an acrylate ester, the process comprising reacting the monomers in an aqueous emulsion in the presence of a water-soluble free radical catalyst, an emulsifying agent and a chain transfer agent, wherein the temperature is maintained at from about 50 to about 70° C. until from 40 to 60 mol percent of the monomers have reacted and then increasing temperatures to 70 to 100° C. The polymer is preferably spray-dried to a particle size of not greater than about 450 microns.

---

Methacrylate polymers, i.e. polymers containing a major proportion of an alkyl methacrylate ester, are known to have a wide range of commercially valuable uses. The low molecular weight polymers, especially the copolymers of the lower molecular weight methacrylate esters, most commonly methyl methacrylate, with the alkyl acrylates, such as methyl, ethyl or propyl acrylate, in a minor proportion, have been found useful to improve the processibility of the vinyl polymers, e.g. by calendering, extrusion, injection molding, blow molding or milling.

The unplasticized vinyl polymers are especially useful in the rigid vinyl compounds containing, for example, less than 5% plasticizer; however, these materials are extremely inflexible and very difficult to work. It has been found that the addition of a methacrylate copolymer to the rigid vinyl polymer improves the processibility without plasticizing. Thus, under the ambient conditions of normal use the methacrylate modified vinyl polymer retains the advantages of the rigid unplasticized vinyl polymer.

The methacrylate/acrylate copolymers which have been found to be most useful as modifying processing aids for vinyl polymers are prepared by emulsion polymerization. These materials have been found to be especially readily dispersed into the vinyl polymer and readily form uniform mixtures therewith. See for example U.S. Pat. No. 3,373,229 to Philpot et al.

The molecular weight of the methacrylate copolymers is especially important in determining its utility as a processing aid for vinyl polymers. The art has recognized that generally molecular weight can be changed by varying the polymerization temperature, the catalyst concentration and the chain transfer agent concentration. Specifically, a decrease in temperature, a decrease in catalyst concentration and a decrease in concentration of chain transfer agents, all lead to increases in the molecular weight. Although these parameters have enabled the art to generally set the molecular weights of the methacrylate copolymers which have been utilized as vinyl polymer additives, the variations in the molecular weight of the commercial materials have been relatively large. It is an objective of this invention to enable close control of molecular weight of the acrylic copolymer.

Modern commercial manufacturers have selected as the polymerization catalyst of choice the so-called free radical catalyst. Earlier workers had considered the use of so-called "redox" catalysts, which primarily comprise an organic peroxide, plus a reducing agent, such as benzoin, plus a small amount of a soluble metal salt such as an iron salt. These catalysts, however, are extremely sensitive to pH and require careful buffering control. Accordingly, in a commercial process, they are extremely difficult to handle and require far more complex controls. These "redox" catalysts accordingly are out of favor as commercially useful materials. Further, polymers prepared utilizing the "redox" catalysts are not readily tailored to a specific molecular weight although there had been early work carried out to limit maximum molecular weight by using a high temperature during the final stage of the polymerization process i.e. after at least 90% of the monomer had been reacted. See U.S. Pat. No. 2,628,225. This procedure, however, resulted in a wide variation of molecular weight in the polymer material, although the maximum molecular weight was reduced. See U.S. Pat. No. 2,628,225 to Tutwiler.

Accordingly, the art had not been previously successful in obtaining a polymerization process utilizing a free radical catalyst wherein the molecular weight of the polymer products could be accurately and reproducibly controlled within a tight limitation, which would render the modifying properties of the methacrylate copolymer more readily controllable, creating a more useful product.

A further problem, which is closely related to that of controlling molecular weight, is controlling the speed of the reaction during the processing stage to prevent a runaway, dangerously overheated reaction mixture. Although, at its extreme point, such a situation could be dangerous to plant operators, it would also result, under less than extreme conditions, in a product which has a molecular weight outside of the desired range, and indeed a product which may be otherwise degraded by the action of too high temperatures. These two problems are alleviated by the process of the present invention, while avoiding an uneconomically slow or low yield reaction.

In accordance with the process of the present invention, a mixture of methyl methacrylate and up to about 20 mol percent of the total monomer present of an acrylate ester in an aqueous emulsion are reacted in the presence of a water-soluble free-radical catalyst, an emulsifying agent and a chain transfer agent, under emulsion conditions, wherein the temperature of the polymerization reaction is maintained in the range of from about 50 to less than about 70° C. until from about 40 to about 60 mol percent of the total monomers present have been polymerized. The temperature is then permitted to increase to within the range of from about 70 to about 100° C., with a rise of at least about 10° C., over a period of from about 10 to about 40 minutes. The second stage temperature is maintained until conversion is substantially complete, which generally means until at least about 98.6 mol percent conversion. In an optimum process, the lower temperature is maintained until about at least about 50 mol percent of the monomers are reacted and the increase in temperature is carried out over a period of from about 20 to about 40 minutes.

In accordance with another aspect of this invention, the emulsion containing the polymer product is most advantageously spray dried to prepare relatively uniform, generally spherical particles with a maximum particle size of about 450 microns, but optimally not above about 430 microns. The mean average particle size can be from about 20 to about 70 microns but preferably from about 25 to about 55 microns, and optimally not above about 45 microns.

It is well known that as a general rule the molecular weight of a methacrylate copolymer, e.g. as prepared in accordance with the present invention, can be determined primarily by the type and proportion of chain transfer agent, i.e. alkyl mercaptan, present. The temperature of the reaction and the amount of catalyst have been known to have a relatively minor effect on the molecular weight of the product. The chain transfer agent is the overriding factor and a desired molecular weight range can be obtained by merely varying the proportion of chain transfer agent in response to any change in temperature, catalyst or monomer concentration. The present process permits very accurate control over the final molecular weight.

The product, prepared in accordance with the present process, has been found to have superior properties to other similar types of copolymers prepared previously. Copolymers prepared in accordance with the process of the present invention have been found to be superior in their effectiveness as modfying additives for vinyl chloride polymers. Specifically, the polymers prepared in accordance with the present invention, when compared with polymers previously commercially available, show an improved, i.e. decreased, plate-out in flexible, i.e., partially plasticized, vinyl polymer compositions, and a shorter fusion time with lower torque in rigid, or substantially unplasticized, vinyl resin compositions. In addition, there is an improvement in the effectiveness of the copolymers prepared in accordance with this invention as modifying agents in vinyl plastisols, with regard to viscosity stability and gelation characteristics compared to the previously available commercial copolymers.

The process of the present invention is preferably carried out as a batch reaction. As pressure does not substantially affect this process, the reaction is preferably carried out under substantially atmospheric pressure, although a slight positive pressure can be desirable, in order to prevent any leakage of atmospheric oxygen into the reaction vessel. The reaction should be carried out under oxygen-free conditions. The reaction vessel is purged of oxygen-containing gas and an inert oxygen-free atmosphere is maintained, combined with preferably, a continuous sparge of an inert oxygen free gas, such as nitrogen or argon.

The emulsion polymerization is generally commercially carried out in aqueous medium; methyl methacrylate and the alkyl acrylate esters are emulsified in the aqueous medium and the emulsion is maintained by continuous agitation and by the presence of a conventional emulsifying agent. The methyl methacrylate, alkyl acrylate, emulsifier and chain transfer agent are first mixed with water to form a uniform emulsion, and then heated to the initial reaction temperature of from about 50 to about 70° C. The catalyst is then added with continued agitation and the temperature is maintained at a substantially constant temperature by cooling, e.g. by a water jacket about the reaction vessel. When at least about 40 mol percent, but not more than 60 mol percent, but preferably about 50 mol percent of the monomers have been reacted to form a polymer, the temperature of the reaction mixture is raised by at least about 10° C. and preferably at least about 20° C. to a temperature in the range of from about 70 to about 100° C., but preferably from about 85 to about 95° C. over a period of about 20 to about 40 minutes. This temperature is maintained substantially constant until the desired degree of completion of reaction. The total reaction time can be from about 2½ to 5½ hours, although generally from 3 to 4 hours is sufficient.

The reaction mixture is then immediately cooled and the latex emulsion is dried to form the easily friable, solid polymer. As stated, the preferred product is preferably formed as regular, substantially spherical particles such as are obtained by spray drying the emulsion. Spray drying of such polymer emulsions is a standard procedure conventionally used in the art. However, in accordance with the present invention, it has been found that a preferred product is obtained when the spray drying is carried out so as to form particles having a maximum particle size of about 450 microns. To form a sharp cut at the desired maximum particle size, the particles, after being dried, are passed through a sieve, or screen, to hold back oversize particles.

The process of the present invention is especially desirable in that it permits ready control of the reaction, preventing any "run-away," or potentially explosive or otherwise dangerous situations, while obtaining substantially complete polymerization, i.e. better than 98% conversion, and a product having superior properties for use as an additive for vinyl resins with a process having an economical rate.

In preparing these methyl methacrylate copolymers, one or more acrylate esters can be mixed in proportions of up to about 20 mol percent of the total monomer present. Most preferably, however, at least about 1 mol percent and up to about 12 mol percent but optimally not above about 10 mol percent of an acrylate ester is present. The acrylates which can be compolymerized with methyl methacrylate to form the methacrylate copolymers can have the formula

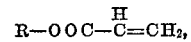

$$R-OOC-\overset{H}{C}=CH_2,$$

wherein R can be an alkyl group having up to about ten carbon atoms but preferably from about 1 to about 4 carbon atoms. Examples of such ester monomers include methyl acrylate, ethyl acrylate, n-propyl acrylate, n-butyl acrylate, t-butyl acrylate, n-heptyy acrylate, 2-ethyl hexyl acrylate, isopropyl acrylate and isobutyl acrylate.

The water-soluble free radical catalysts useful in the present invention include, for example, hydrogen peroxide and the ammonium and alkali metal salts of persulfuric acid. Hydrogen peroxide and the persulfates are generally soluble in water therefore, are readily dispersed throughout the reaction medium. Potassium persulfate and ammonium persulfate are most highly preferred. However, where desired or where the economics are advantageous, sodium persulfate and lithium persulfate are also commercially useful. Generally, from about 0.001 to about 1.0% of catalyst by weight of monomer is used in the reaction of this invention.

Chain transfer agents which are highly effective in the process of the present invention are the alkyl mercaptans containing from about 4 to about 20 carbon atoms, and preferably from about 8 to about 16 carbon atoms.

Especially useful chain transfer agents include n-butyl mercaptan, sec-butyl mercaptan, t-butyl mercaptan, n-decyl mercaptan, n-dodecyl mercaptan and t-dodecyl mercaptan. Generally, from about 0.01 to about 1% transfer agent by weight of total monomer is used, and preferably not more than about 0.5% by weight.

The emulsifiers useful to maintain the dispersed phase of the monomer and polymer during the polymerization reaction of this invention include any of the commonly available emulsifiers. Generally, less than about 3% by weight of emulsifiers based on the total weight of polymerizable monomer charge is added and preferably from about 0.5 to about 2% by weight. The usual emulsifying agents include common sodium soaps, sodium alkyl benzene sulfonates, such as sodium dodecyl benzene sulfonate, ethoxylated alkyl phenols, such as nonylphenoxy poly (ethylenoxy) ethanol, sodium alkyl sulfates, such as sodium lauryl sulfate, and salts of long chain carboxylic and sulfonic acids. Generally, the emulsifiers are compounds containing hydrocarbon groups having from about 8 to about 22 carbon atoms coupled to highly polar solubilizing groups, e.g. sulfonate groups, phosphate partial-ester groups, and other water-soluble radicals. These emulsifying agents are well known in the art and are not a part of the present invention.

The copolymer emulsion, subsequent to the completion of the polymerization reaction, can be mixed with a vinyl polymer latex, and then the combined latex dried to form a polymer resin composition. This is well known in the art and not a part of the present invention. Alternatively, the methacrylate copolymer emulsion latex can be separately dried, and then mixed with a vinyl polymer.

In this specification, the molecular weight of a polymer is measured in terms of the viscosity at 20° C. of a solution of 0.1 g. of the polymer in 100 ml. of chloroform. The viscosity measured is the so-called "reduced specific viscosity" (N) which is defined as:

$$N = \frac{\frac{T-T_0}{T_0}}{C}$$

wherein C equals concentration of a polymer solution expressed as grams of polymer per 100 milliliters of solvent; T equals flow time in seconds of the polymer solution and $T_0$ equals flow time in seconds of the solvent.

The polymer product prepared according to this process can have a reduced specific viscosity in the range of from about 1.5 to about 5, but preferably up to about 4. However, it has been found that the process is especially effective and a most preferred product is obtained with a reduced viscosity in the range of from about 2 to about 3; polymers within the most preferred reduced viscosity range are especially useful as additives to vinyl polymers in amounts of up to about 20% by weight copolymer based on total weight of vinyl polymer resin composition. Preferably, however, at least about 1% by weight is present and up to about 10% by weight of the methacrylate copolymer is preferred for use in molding or extrusion grade of vinyl polymer resin.

The vinyl polymer resins in which the copolymers prepared by the present invention are useful are generally polymers of vinyl chloride alone or copolymers of vinyl chloride and up to about 30% of a copolymerizable monomer. The copolymerizable monomers include other vinyl polymers such as, the alkenes, e.g. ethylene, propylene and butylene and isomers thereof, as well as the halo-substituted materials such as, vinylidene chloride, styrene, acrylonitrile, vinyl esters, e.g. vinyl acetate, alkyl methacrylate esters, alkyl acrylate esters and acrylic and methacrylic acids. After-halogenated ethylene and vinyl chloride polymers can also be modified utilizing the methyl methacrylate copolymers of the present invention.

The copolymers prepared by the present invention when added to the polyvinyl chloride formulations improve the melt-flow characteristics of the vinyl polymer during processing. This property permits the production of smoother, more transparent, polymer products by extrusion, injection molding, compression molding, blow-molding and calendaring.

The effectiveness of the methacrylate copolymer prepared by this invention is evidenced by an examination of articles fabricated from a vinyl polymer with and without the methacrylate copolymer. Desirably, products produced, for example, by injection molding should have a clear, smooth surface finish unmarred by any dull marks or streaking. Further, a transparent article is measured by its clarity. In addition, cracks or tears may appear in the surface of the finished article. Furthermore, the processability of the vinyl polymer is also affected by the addition of the methacrylate copolymer. When calendering and milling, for example, such properties as the rolling bank effect, sheet smoothness, hot tear strength and mill stick time are relevant, and a definite improvement can be shown in these by utilizing the methacrylate copolymers of the present invention.

The following examples illustrate the present invention, but are intended to be exemplary and not exclusive of the full scope of the present invention.

EXAMPLE 1

The following ingredients are charged to reaction vessel equipped with a stirrer, a gas outlet, a thermometer and a gas inlet and including a cooling water jacket around the outside of the vessel.

| Components: | Parts by weight |
|---|---|
| Methyl methacrylate | 92.5 |
| Ethyl acrylate | 7.5 |
| Water | 184 |
| n-dodecyl mercaptan | .065 |
| Sodium lauryl sulfate | 0.7 |
| Potassium persulfate, aqueous solution (.25% by wt.) | 2 |

The water, methyl methacrylate and ethyl acrylate are completely mixed with the mercaptan and sodium lauryl sulfate in the reaction vessel. The atmosphere above the reaction is exhausted, and nitrogen gas sparged into the autoclave. The reaction vessel is then heated to 60° C. under continued agitation at which point the aqueous solution of catalyst, containing 0.005 parts of potassium persulfate, is added. The reaction mixture is maintained at 60° C. until 50% of the monomers have been converted. After approximately 140 minutes, the temperature in the reaction vessel is increased to 88° C. over a 30 minute period, and maintained at that temperature until conversion of 98.6% is reached. The total time is approximately 3 to 4 hours. The polymer had a reduced specific viscosity at 20° C. in chloroform of 2.47.

The latex emulsion of the acrylic polymer is then cooled to room temperature and filtered through a 14 mesh screen to yield a latex containing about 35% solids. The latex is then dried in a spray dryer. The dried latex is passed through a scalping sieve (40 mesh) to remove oversize particles.

The dried product comprised a substantially spherical particulate material, having less than a 40 mesh maximum and a mean average particle size of about 30 microns. The product is readily blended into a vinyl chloride polymer on a two-roll mill and the blend of resins shows very good-to-excellent rolling bank effect, sheet smoothness, hot tear strength and low mill stick time when milled and calendered. Smooth, transparent parts are obtained by both calendering and extrusion of the blended resins.

The further surprising aspect of this invention has been shown by tests comparing a commercially available methacrylate polymer processing air (A) with the product prepared in accordance with this invention. Product A had a mean average particle size of 50 microns. At a constant proportion of methacrylic polymer processing aid in polyvinyl chloride resin the Brabender extrusion rate for the PVC resin was significantly greater for the PVC resin containing the material of this invention, and the fusion time and torque required at fusion on a Brabender roller mill, were substantially lower with the product of this invention. Similarly, a substantially lower proportion of the methacrylic polymer processing aid of this invention was added to PVC to obtain a mill rolling bank compared to using product A; a visual test of samples of milled sheets of PVC showed substantially more undesirable gel visible when using the Product A than when using the copolymer of this invention. In addition, PVC resin containing the product prepared according to the above example has less of a tendency to stick to the mill rolls during processing.

EXAMPLES 2 THROUGH 5

The procedures of Example 1 were repeated, but utilizing the proportion of reactants shown in the following table with the results shown.

| Example | 2 | 3 | 4 | 5 |
|---|---|---|---|---|
| Methyl methacrylate, pbw | 90 | 88 | 88 | 88 |
| Ethyl acrylate, pbw | 10 | 12 | 12 | 12 |
| Water, pbw | 186 | 186 | 186 | 186 |
| n-Dodecyl mercaptan, pbw | 0.065 | 0.040 | 0.0385 | 0.030 |
| Sodium lauryl sulfate, pbw | 0.7 | 1.0 | 1.0 | 1.0 |
| Potassium persulfate, pbw | 0.005 | 0.006 | 0.006 | 0.006 |
| Reduced specific viscosity | 2.59 | 3.08 | 3.35 | 3.95 |

The data in the above table shows the affect of decreasing the amount of chain transfer agents on increasing molecular weight as shown by the increase in reduced specific viscosity. A fine particulate product, useful for admixture with a vinyl chloride polymer resin, was obtained in each case.

The patentable embodiments of this invention which are claimed are:

1. In a process for the preparation of methyl methacrylate-alkyl acrylate copolymers wherein an aqueous emulsion that contains (i) a monomer mixture consisting of 80 to 99 mol percent of methyl methacrylate and 1 to 20 mol percent of at least one alkyl acrylate having the structural formlua

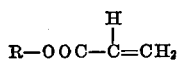

wherein R represents an alkyl group having 1 to 10 carbon atoms, (ii) a water-soluble free-radical catalyst selected from the group consisting of hydrogen peroxide, ammonium persulfate, and alkali metal persulfates, (iii) an emulsifying agent, and (iv) an alkyl mercaptan having 4 to 10 carbon atoms is heated until the monomer mixture has polymerized, the improvement comprising the steps of (a) maintaining said aqueous emulsion at a temperature in the range of about 50° to 70° C. until about 40 to 60 mol percent of the monomer mixture has polymerized, (b) raising the temperature of the aqueous emulsion by at least 10° C. to a temperature in the range of about 70° to 100° C. over a period of about 10 to 40 minutes, (c) maintaining the aqueous emulsion at a temperature of about 70° to 100° C. until the polymerization of the monomer mixture is substantially complete, and (d) cooling the resulting aqueous emulsion to obtain a latex emulsion of the methyl methacrylate-alkyl acrylate copolymer.

2. The process of claim 1 wherein the monomer mixture contains 88 to 99 mol percent of methyl methacrylate and 1 to 12 mol percent of said alkyl acrylate.

3. The process of claim 1 wherein the monomer mixture contains 90 to 99 mol percent of methyl methacrylate and 1 to 10 mol percent of an alkyl acrylate wherein the alkyl group has 1 to 4 carbon atoms.

4. The process of claim 3 wherein the alkyl acrylate is ethyl acrylate.

5. The process of claim 1 wherein in Step (a) the aqueous emulsion is maintained at a temperature in the range of about 50° to 70° C. until about 50 mol percent of the monomer mixture has polymerized.

6. The process of claim 1 wherein in Step (b) the temperature of the aqueous emulsion is raised by at least 20° C. over a period of 20 to 40 minutes.

7. The process of claim 1 wherein in Step (b) the temperature of the aqueous emulsion is raised to 85° to 95° C.

8. The process of claim 1 wherein in Step (c) the aqueous emulsion is maintained at a temperature in the range of 85° to 95° C. until the polymerization has been substantially completed.

9. The process of claim 1 wherein the latex emulsion obtained in Step (d) is dried to form a particulate product consisting of uniform, substantially spherical particles having a maximum particle size of about 450 microns.

10. The process of claim 1 wherein the latex emulsion obtained in Step (d) is spray dried to form a particulate product consisting of particles having a maximum particle size of 430 microns.

11. The process of claim 1 wherein the latex emulsion obtained in Step (d) is spray dried to form a particulate product consisting of uniform, substantially spherical particles having a mean average particle size of 20 to 70 microns and a reduced specific viscosity of about 1.5 to 5.0 as measured in a 0.1% solution of the copolymer in chloroform at 20° C.

12. The process of claim 11 wherein the product consists of particles having a mean average particle size of 25 to 45 microns and a reduced specific viscosity of 2 to 3 as measured in a 0.1% soution of the copolymer in chloroform at 20° C.

13. The copolymer that is the product of the process of claim 1.

References Cited

UNITED STATES PATENTS

| | | | |
|---|---|---|---|
| 2,450,000 | 9/1948 | Howk et al. | 260—86.1 E |
| 3,084,065 | 4/1963 | Bach | 260—86.1 E |
| 3,219,611 | 11/1965 | Witwer | 260—86.1 E |

HARRY WONG, Jr., Primary Examiner

U.S. Cl. X.R.

260—29.6 R, 897 C, 898, 899